(12) United States Patent
Murphy (10) Patent No.: US 11,065,647 B2
(45) Date of Patent: Jul. 20, 2021

(54) ADJUSTABLE VIBRATORY DRIVE SYSTEM

(71) Applicant: Terex GB Limited, Dungannon (GB)

(72) Inventor: Glenn Murphy, Craigavon (GB)

(73) Assignee: TEREX GB LIMITED, Dungannon (GB)

( * ) Notice: Subject to any disclaimer, the term of this patent is extended or adjusted under 35 U.S.C. 154(b) by 154 days.

(21) Appl. No.: 16/406,247

(22) Filed: May 8, 2019

(65) Prior Publication Data

US 2019/0344311 A1 Nov. 14, 2019

(30) Foreign Application Priority Data

May 8, 2018 (GB) ..................................... 1807509

(51) Int. Cl.
*B07B 1/36* (2006.01)
*B07B 1/28* (2006.01)

(52) U.S. Cl.
CPC ............... *B07B 1/284* (2013.01); *B07B 1/36* (2013.01)

(58) Field of Classification Search
CPC .. B07B 1/284; B07B 1/36; B07B 1/42; B06B 1/166; B65G 27/32
See application file for complete search history.

(56) References Cited

U.S. PATENT DOCUMENTS

| | | | |
|---|---|---|---|
| 3,883,260 A | 5/1975 | Heckner | |
| 4,517,771 A * | 5/1985 | Kobayashi | B06B 1/161 451/327 |
| 5,392,898 A * | 2/1995 | Burgess, Jr. | B06B 1/166 198/750.8 |
| 5,979,640 A * | 11/1999 | Horton | B65G 27/32 198/752.1 |
| 6,024,210 A * | 2/2000 | Rosenstrom | G05D 19/02 198/758 |
| 6,269,940 B1 * | 8/2001 | Rosenstrom | B65G 27/20 198/750.8 |
| 6,601,695 B1 * | 8/2003 | Rosenstrom | B06B 1/16 198/750.1 |
| 8,091,711 B2 * | 1/2012 | Hsiau | B07B 13/18 209/284 |

FOREIGN PATENT DOCUMENTS

| | | |
|---|---|---|
| CN | 202570608 | 12/2012 |
| CN | 203030507 | 7/2013 |
| GB | 1374517 | 11/1974 |
| GB | 2034437 | 6/1980 |
| GB | 2112903 | 7/1983 |
| WO | 97/07042 | 2/1997 |

OTHER PUBLICATIONS

UK Search Report of corresponding UK Application No. GB1807509.3, dated Nov. 5, 2018.

* cited by examiner

*Primary Examiner* — Patrick H Mackey
(74) *Attorney, Agent, or Firm* — Gardner Linn (57) ABSTRACT

A vibratory drive system, suitable for a material screening apparatus, includes rotatable drive shafts each having a centre of mass offset from its rotational axis. A respective drive mechanism is coupled to each drive shaft and is controlled by a controller. The controller adjusts the relative rotational speed of the drive shafts to adjust the relative angular position of the respective centre of mass of the drive shafts. This adjustment allows the vibratory characteristics of the drive system to be changed without having to halt the drive system.

18 Claims, 6 Drawing Sheets

ADJUSTABLE VIBRATORY DRIVE SYSTEM

FIELD OF THE INVENTION

This invention relates to vibratory drive systems and, in particular, to vibratory drive systems for material processing apparatus.

BACKGROUND TO THE INVENTION

Vibratory drive systems may be used in many applications. In the field of material processing, for example, vibratory drive systems may be used in screening apparatus and in some feeders and conveyors.

By way of example, mechanical screening, which is usually just referred to as screening, involves separating particulate material, such as rocks, sand, or other aggregate material, by particle size. Screening is used in a variety of industries including mining, quarrying, mineral processing, agriculture and recycling.

A conventional screening apparatus comprises a body that carries one or more decks of screen media. A vibratory drive system is provided for vibrating the body and decks. A known type of vibratory drive system includes multiple, eccentrically weighted, rotatable shafts, mechanically coupled together and driven by a common motor. Each shaft carries an eccentrically mounted mass, and the respective angular positions of the masses define a phase angle between shafts. The coupled shafts rotate in opposite directions and cause the screening apparatus to vibrate linearly or elliptically. The characteristics of the vibrations depend on the phase angle between the shafts.

A problem with such drive systems is that the shafts are typically mechanically locked together by, for example, gears or timing belts. Adjusting the phase angle in order to adjust the vibration characteristics, requires significant down-time for the screening apparatus and any machine of which it is part, since the drive system must be stopped to allow an operator to make the necessary mechanical adjustments. Also, drive shafts that are mechanically coupled together are limited to the type of vibration that they can cause.

SUMMARY OF THE INVENTION

A first aspect of the invention provides a vibratory drive system comprising a plurality of rotatable drive shafts each having a centre of mass offset from its rotational axis, a respective drive mechanism coupled to a respective one of the drive shafts for rotating the respective drive shaft, and a controller for operating at least one of the drive mechanisms to control the rotational speed of the respective drive shaft, wherein the controller is configured to adjust the rotational speed of at least one of the drive shafts to adjust the relative angular position of the respective centre of mass of at least two of the drive shafts.

Optionally, the controller is configured to adjust the rotational speed of at least one of the drive shafts to cause at least two of the drive shafts to rotate at different speeds until a desired relative angular position of the respective centres of mass is achieved, and then to cause the at least two drive shafts to rotate at the same speed. The controller may be configured to adjust the rotational speed of the at least one drive shaft in response to a change in rotational speed of another of the drive shafts.

The controller may be configured to receive an input indicating at least one desired rotational speed for at least one of the drive shafts, and to adjust the rotational speed of the at least one drive shaft to match the at least one desired rotational speed.

The controller may be configured to receive an input indicating at least one desired relative angular position of at least two of the drive shafts, and is configured to adjust the rotational speed of at least one of the drive shafts to cause the at least two drive shafts to rotate at different speeds until the at least one desired relative angular position is achieved.

At least one of (and optionally all of) the drive mechanisms may be operable to rotate the respective drive shaft in either one of two rotational directions, the controller being configured to cause the respective drive shaft to rotate in a desired rotational direction. The controller may be configured to receive an input indicating at least one desired rotational direction for at least one of (and optionally all of) the drive shafts.

In typical embodiments, at least one of (and optionally each of) the drive mechanisms comprises a motor. The motor may comprise a hydraulic motor or an electric motor. The motor may be coupled to the respective drive shaft to provide direct drive to the drive shaft. For example, the motor can be mounted on the end of the respective drive shaft. The motor may be a reversible motor.

In typical embodiments, the plurality of drive shafts comprise first and second drive shafts, the controller being configured to adjust the rotational speed of either one or both of the first and second drive shafts to adjust the relative angular position of the respective centre of mass of the first and second drive shafts. The controller may be configured to determine an actual relative angular position between first and second of the drive shafts, and to adjust the rotational speed of either one or both of the first and second drive shafts to achieve a desired relative angular position between the first and second drive shafts.

The controller may be configured to determine an actual relative angular position between the at least two of the drive shafts, and to adjust the rotational speed of at least one of the drive shafts to adjust the relative angular position of the respective centre of mass of at least two of the drive shafts to achieve a desired relative angular position between the at least two drive shafts Typically, a respective angular position sensor is coupled to each of the drive shafts for detecting an angular position of the respective drive shaft, and communicating corresponding angular position information to the controller. The controller is conveniently configured to determine the relative angular position from the angular position information for the respective drive shafts. Advantageously, the angular position sensor provides information indicative of the rotational speed of the respective drive shaft.

Optionally, a rotational speed sensor is coupled to each of the drive shafts for detecting the rotational speed the respective drive shaft, and communicating corresponding speed information to the controller.

From a second aspect the invention provides a material processing apparatus comprising at least one vibrating component, and a drive system for vibrating the at least one vibrating component, wherein the drive system comprises a plurality of rotatable drive shafts each having a centre of mass offset from its rotational axis, a respective drive mechanism coupled to a respective one of the drive shafts for rotating the respective drive shaft, and a controller for operating at least one of the drive mechanisms to control the rotational speed of the respective drive shaft, wherein the controller is configured to adjust the rotational speed of at least one of the drive shafts to adjust the relative angular position of the respective centre of mass of at least two of the drive shafts.

In some embodiments, the at least one vibrating component comprises at least one screen.

Further advantageous aspects of the invention will be apparent to those ordinary skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

Referring now in particular to FIGS. 1 to 4 and 6 of the drawings there is shown, generally indicated as 15, a vibratory drive system embodying one aspect of the invention. In the illustrated embodiment, the drive system 15 is part of a material screening apparatus 10. The screening apparatus 10 is of a type suitable for use in separating particulate material, e.g. sand, stones, rocks or other aggregate material or recyclable material, according to size. It will be understood that drive systems embodying the invention are not limited to use with screening apparatus, and may alternatively be used in other applications, including with other material processing apparatus such as vibrating conveyors and vibrating feeders.

Figure 1:
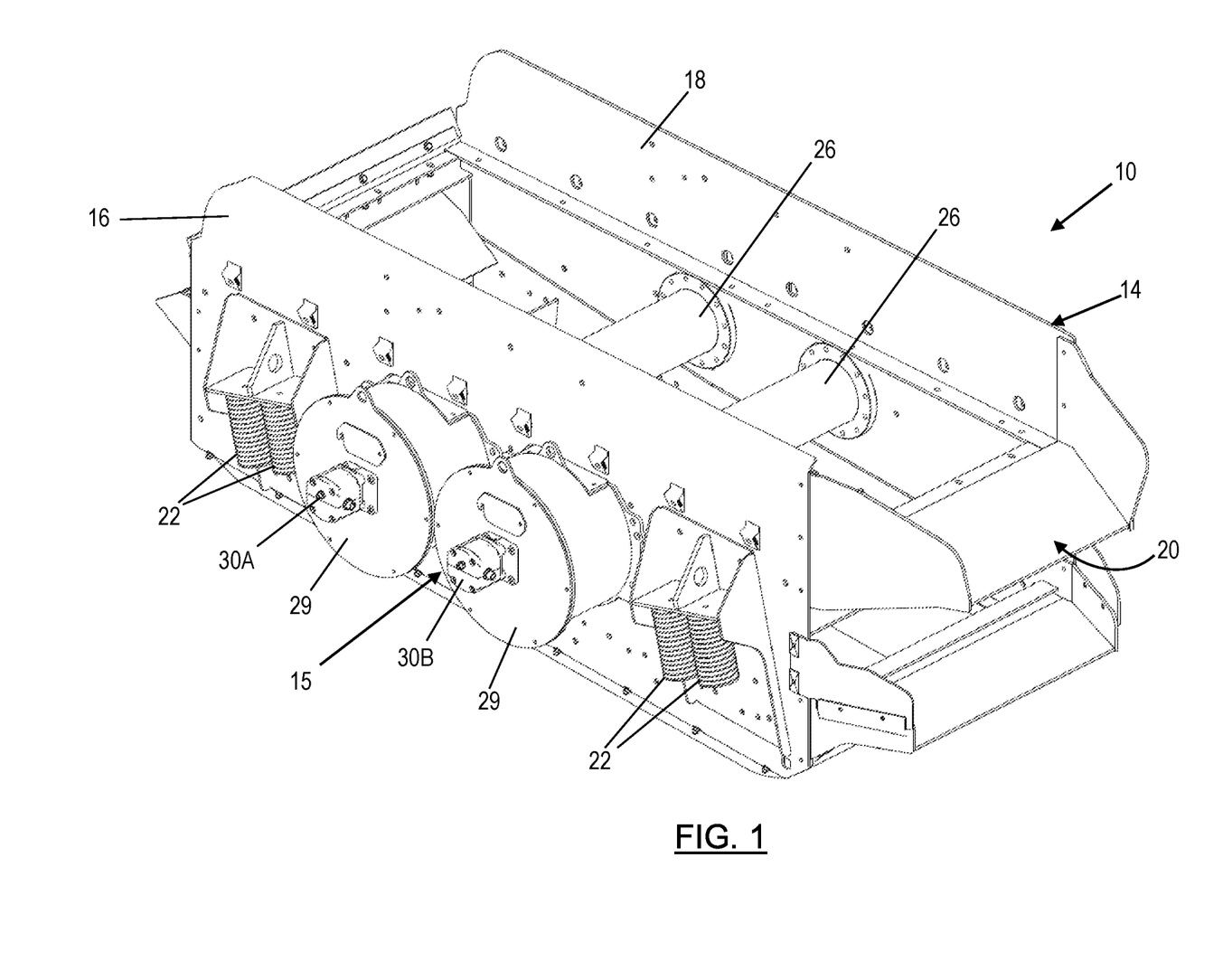
FIG. 1 is a perspective view of a screening apparatus embodying one aspect of the invention, including a drive system embodying another aspect of the invention.
Figure 2:
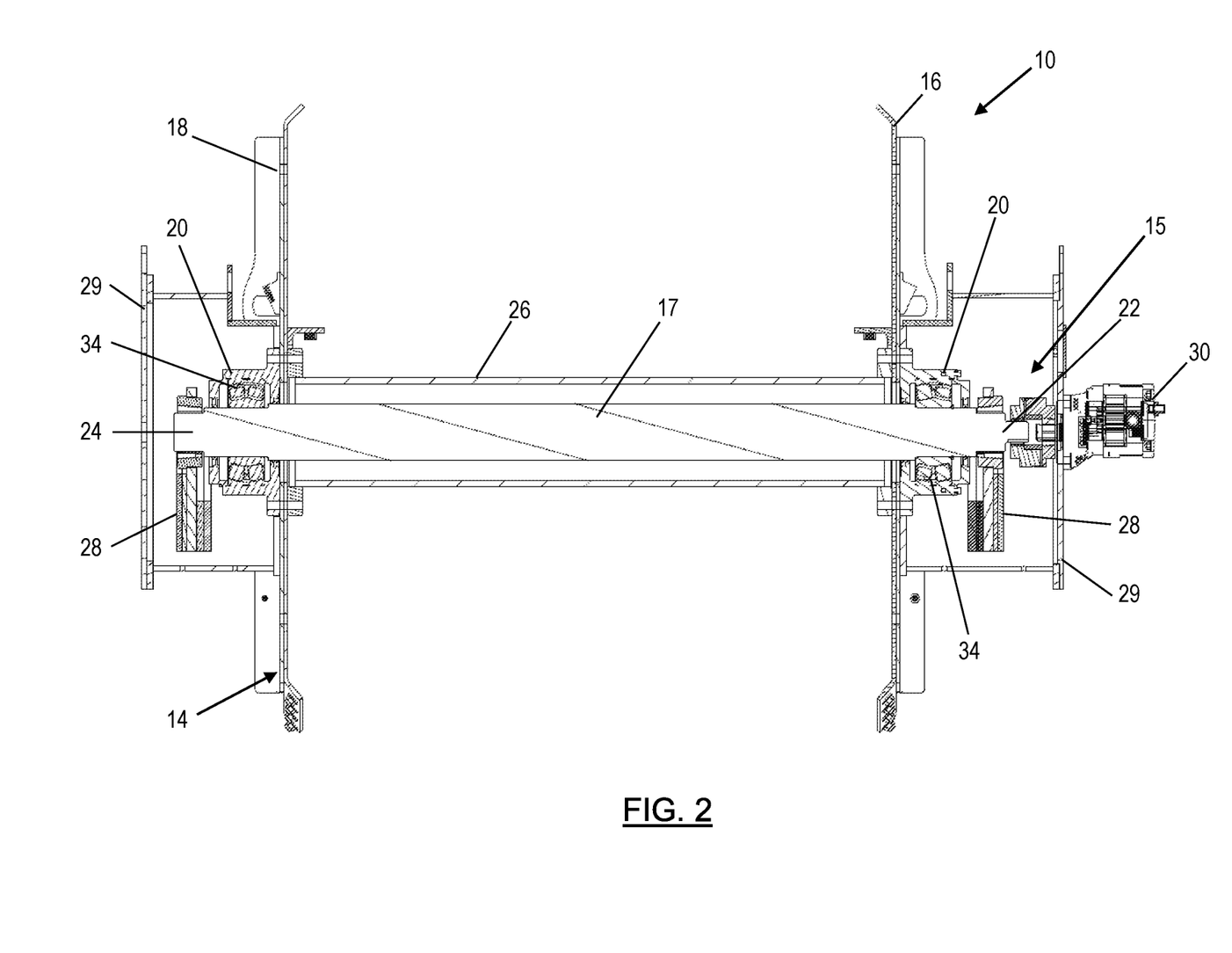
FIG. 2 is a sectioned end view of the screening apparatus and the drive system of FIG. 1.

The screening apparatus 10 comprises a body 14 for carrying one or more material screens. The screens are typically provided in one or more screening decks 12 between opposing side walls 16, 18 of the body 14. In typical embodiments, the body 14 is box-like in form, although it may comprise any supporting structure that is shaped and dimensioned to carry one or more screening decks 12. Typically at least one end 20 of the body 14 is open to allow screened material to be removed from the screening apparatus 10, for example by a conveyor (not shown). The screens may take any conventional form, for example comprising bars, a mesh, a cloth or a grid.

Figure 6:
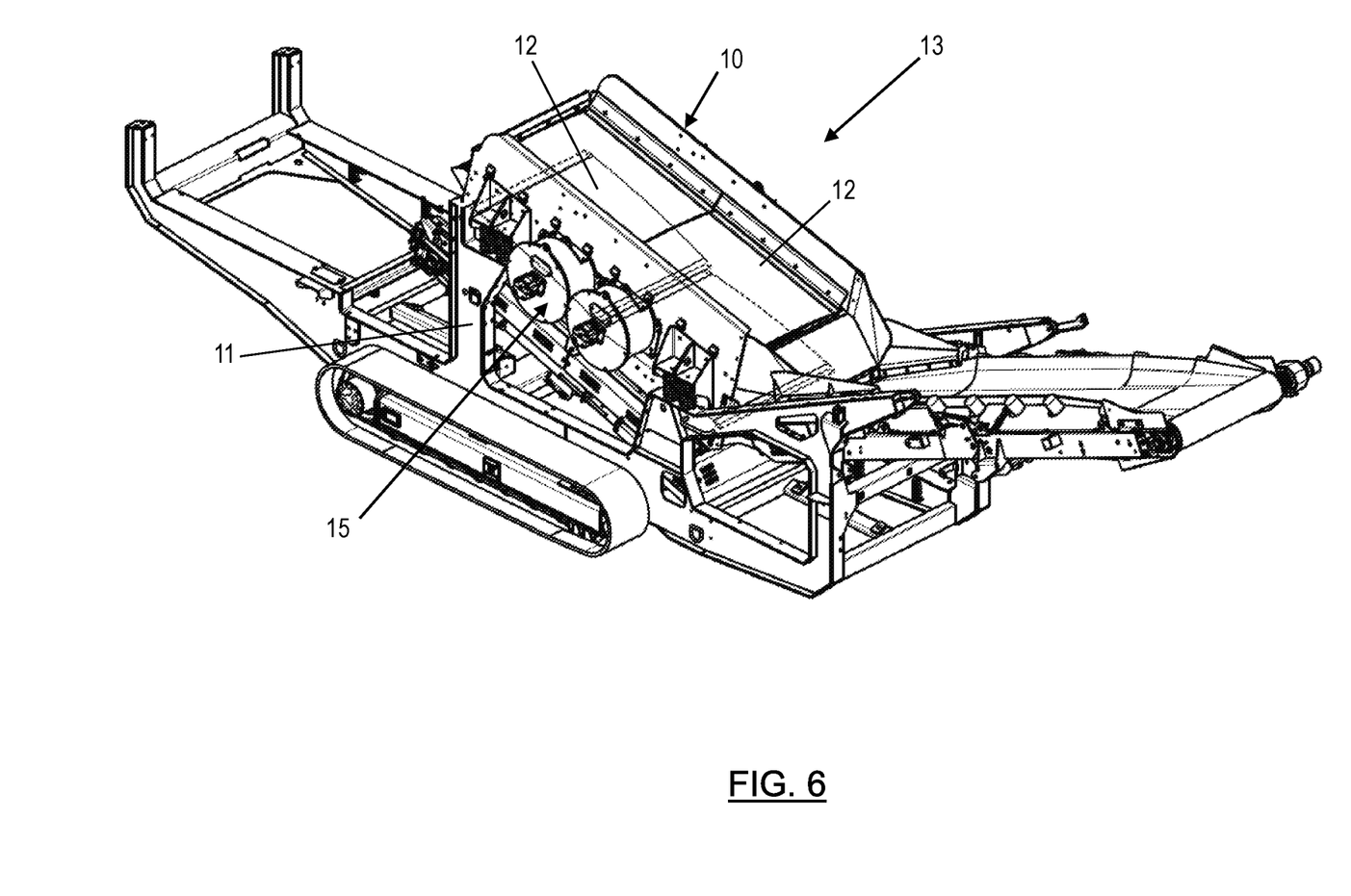
FIG. 6 is a perspective view of the screening apparatus of FIG. 1 incorporated into a material processing apparatus.

In use, the screening apparatus 10 is mounted on a base 11, which may for example be part, e.g. the chassis, of a material processing system 13 of which the apparatus 10 is part. The screening apparatus 10 is mounted on the base 11 by a suspension system which, in the illustrated embodiment, comprises springs 22, to allow relative movement between the screening apparatus 10 and the base 11. The material processing system 13 may take various forms, for example including any one or more of: one or more conveyors for conveying material to or from the apparatus 10, a feeder, and/or other material processing apparatus. It will be understood that, in embodiments where the drive system 15 is incorporated into another type of material processing apparatus other than a screening apparatus, the material process apparatus may be similarly mounted on the base 11 by a suspension system.

Figure 3:
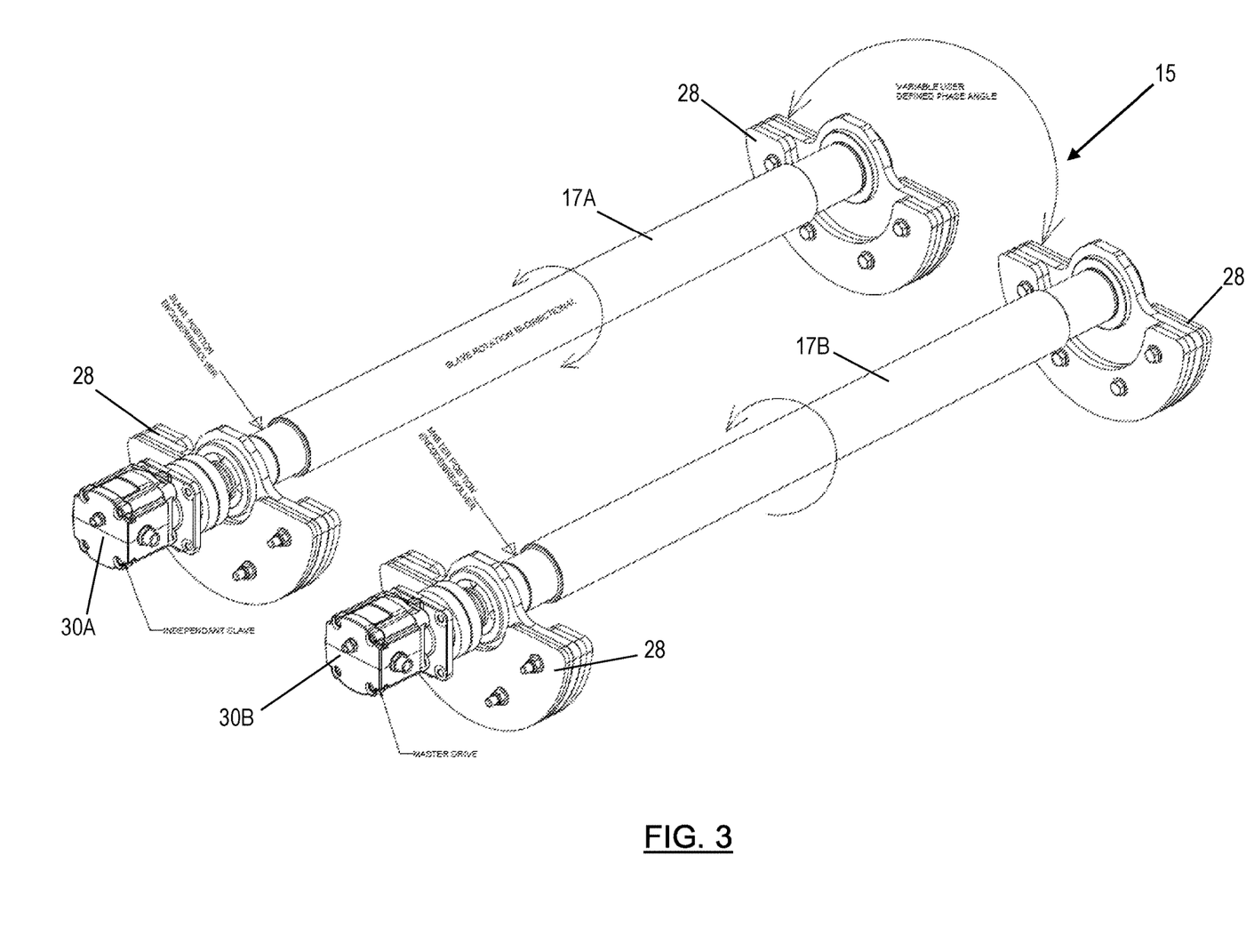
FIG. 3 is a perspective view of an embodiment of the drive system.

In use, the vibratory drive system 15 for causes the screening apparatus 10 to vibrate. The drive system 15 is coupled to the body 14 in order to vibrate the body 14. The vibration causes the screen(s) (and/or other vibrating component(s) depending on the embodiment) carried by the body 14 to vibrate. The drive system 15 comprises at least two drive shafts 17, which are preferably but not necessarily parallel with each other. In the illustrated embodiment, the screening apparatus 10 has two drive shafts 17A, 17B. In alternative embodiments (not illustrated) there may be three or more drive shafts. Each shaft 17 extends across the body 14, between the side walls 16, 18. The shafts 17 may be perpendicular with the walls 16, 18 but may alternatively be oblique with respect to the walls 16, 18. Alternatively still, the shafts 17 may extend longitudinally of the body 14 (parallel or non-parallel with the walls 16, 18) for example being mounted between the ends of the body 14, or mounted on one or each side 16, 18 of the body 14. The shafts 17 are rotatable about their longitudinal axis, which typically is disposed transversely of the body 14. The shafts 17 are spaced apart in the longitudinal or transverse direction of the body 14 as applicable. The shafts 17 may be at the same horizontal level or at different horizontal levels.

Typically, each shaft 17 is mounted on the body 14 by a respective bearing 20 at each end 22, 24 of the shaft 17. In the illustrated embodiment, the ends 22, 24 of each shaft 17 pass through a respective aperture provided in the respective side wall 16, 18. The respective bearing 20 is conveniently mounted in the respective side wall 16, 18 and fits around the respective end 22, 24 of the shaft 17 to allow the shaft 17 to rotate axially. In the illustrated embodiment, the portion of each shaft 17 that is located between the walls 16, 18 is located within an enclosure 26, which in the illustrated example comprises a tube. The enclosure 26 may be supported by the same structures that provide or include the bearing 20.

Each shaft 17 is eccentrically weighted, i.e. the mass of the shaft 17 (including any object carried by the shaft) is not evenly distributed around the shaft's rotational axis. As such, each shaft 17 may be described as an "out-of-balance" rotatable shaft, in that its centre of mass (or inertia axis) is out of alignment with its centre of rotation (or geometric axis). Conveniently, in order to unbalance the shaft in this way, each shaft 17 carries one or more mass 28 (or weight). The (or each) mass 28 is eccentrically located with respect to the rotational axis of the shaft 17 in order to unbalance the rotation of the shaft 17. In this example, each shaft 17 carries a respective mass 28 at each end 22, 24. Where a shaft 17 carries more than one mass 28, it is desirable for the masses 28 to be angularly aligned with each other about the rotation axis of the shaft 17. In alternative embodiments, one or more mass may be provided at one end of the shaft only.

Simultaneous rotation of the eccentrically weighted shafts 17 causes the screening apparatus 10 to move (vibrate) with respect to the base 11. The respective rotational phase and rotational direction of the shafts 17 determine the type of vibratory movement that is caused (e.g. linear vibrations or orbital (e.g. circular or elliptical) vibrations). For example, counter rotating shafts cause linear or elliptical vibration, while co-rotating shafts cause circular vibration. The relative rotating out of balance in a given rotational direction also influences vibratory movement. For example in a two shaft equal speed counter-rotating system, equal out of balance shafts results in a linear stroke, while dissimilar out of balance shafts results in an elliptical motion. In the case of an equal speed shaft shaft system, out of balance on each shaft can be the same, two shafts may rotate clockwise and one shaft may rotate counter-clockwise, the resulting difference in combined out of balance in each rotation direction results in an elliptical motion. Other characteristics of the vibration (e.g. specific shape, amplitude and acceleration) depend on the rotational speed of the shafts 17 and on the phase (angular) difference between the shafts 17, as is described in more detail below.

Figure 4:
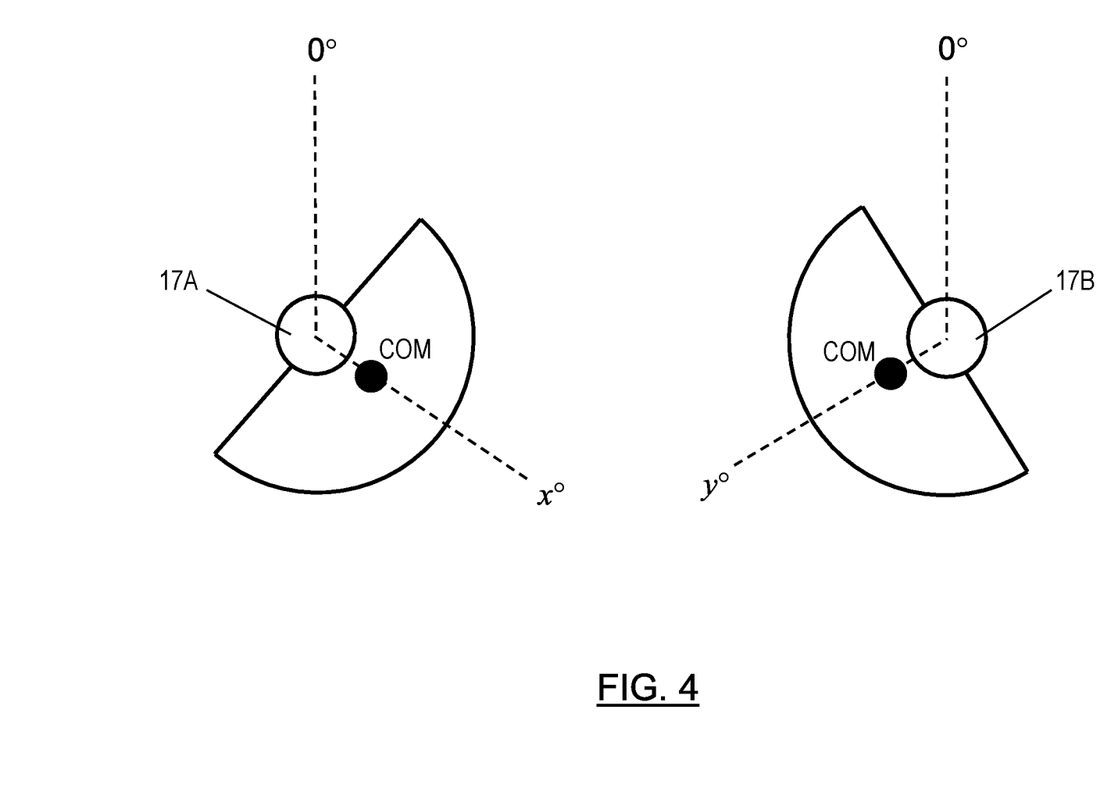
FIG. 4 is a schematic end view first and second drive shafts.

Referring in particular to FIG. 4, first and second drive shafts 17A, 17B are shown schematically in end view with respective masses 28. The centre of mass (COM) of each shaft 17A, 17B is offset (linearly) from the respective rotational axis of the respective shaft 17A, 17B, causing each shaft to be rotationally out-of-balance. The angular position of the respective COM of each shaft 17A, 17B with respect to a reference angle (shown by way of example as 0° in FIG. 4) may be referred to as the phase of the shaft 17A, 17B. In the illustrated example, shaft 17A is displaced by x° from the reference angle, while shaft 17B is displaced by y° from the reference angle. The angle of displacement from the reference angle may be referred to as the phase angle. The difference between the respective phase angles of any two shafts may be referred to as the phase difference, or phase difference angle, between the shafts. In the present example, the phase difference angle (which may also be referred to as the relative phase angle) between shafts 17A and 17B is y°-x°. The phase difference angle between any two or more shafts is maintained as long as the respective shafts 17 rotate at the same speed. The phase difference angle changes when the relative rotational speed of the respective shafts 17 changes. The phase difference between the shafts 17A, 17B affects the characteristics of the vibration caused by the drive system 15. For example, in cases where the shafts 17A, 17B rotate in the same direction, the phase difference angle between the shafts 17A, 17B determines the size (amplitude) of the circular vibration. In cases where the shafts 17A, 17B rotate in opposite directions, the phase difference angle determines the angle of the linear or elliptical vibration. In this connection, the angle of linear/elliptical vibration is the angle of the major axis of the resulting screen motion relative to the screen coordinate system. Although only two drive shafts are shown in FIG. 1, it will be understood that, more generally, each one of any number of multiple drive shafts may be in phase or out of phase with one or more of the other drive shafts depending on the respective phase angle of the shafts.

The drive system 15 includes a respective drive mechanism for each drive shaft 17, each drive mechanism being configured to rotate a respective one of the drive shafts 17. In some embodiments, each drive mechanism comprises a respective motor 30A, 30B coupled to the respective drive shaft 17A, 17B. The motors 30A, 30B are conveniently hydraulic motors, but may alternatively be of any other conventional type, e.g. electric or pneumatic motors. Optionally, and as shown, each motor 30A, 30B is mounted on the end 22 of the respective drive shaft 17A, 17B. As such, the motor 30A, 30B may be coupled to the respective shaft 17A, 17B to provide direct drive to the shaft, i.e. without any reductions as would be caused by a gear system.

Alternatively, the motor 30A, 30B (or other suitable driving device such as an engine) may be coupled to the respective drive shaft 17A, 17B by any conventional coupling mechanism, for example comprising pulley(s), drive chain(s) and/or a gear system.

In any event, it is generally desirable that the drive mechanisms are capable of rotating the respective shafts 17A, 17B in either one of both rotational directions (clockwise and counter-clockwise), and at a variable speed. To this end, each drive mechanism may comprise a reversible, variable speed motor. Alternatively, the drive mechanism may include a coupling mechanism, e.g. a gear system, that is operable to allow rotation of the respective drive shaft in either direction and at a variable speed. In alternative embodiments, at least one but not necessarily all of the drive mechanisms are capable of rotating the respective drive shaft in both rotational directions, and/or are capable of rotating the respective drive shaft at variable speed. In some embodiments, all of the drive mechanism may be capable of rotating the respective drive shaft in one direction only.

In the illustrated embodiment, a respective housing 29 is provided for covering each end 22, 24 of each shaft 17A, 17B. The housings 29 may cover the respective masses 28. Optionally, each motor 30A, 30B is mounted on the outside of the respective housing 29 and is coupled to the respective shaft 17A, 17B through the housing 29.

The drive system 15 further includes a controller 32 (FIG. 5) for controlling the operation of the motors 30A, 30B, or other drive mechanisms as applicable. The controller 32 may take any conventional form, for example comprising a suitably programmed microprocessor, microcontroller or other processor, and/or suitably configured electrical and/or electronic circuitry. In the illustrated embodiment, the controller 32 is implemented as a programmable logic controller (PLC). By way of example, the controller 32 is a proportional integral derivative (PID) controller. In any event, the controller 32 is programmed or otherwise configured to perform the functionality described herein.

Figure 5:
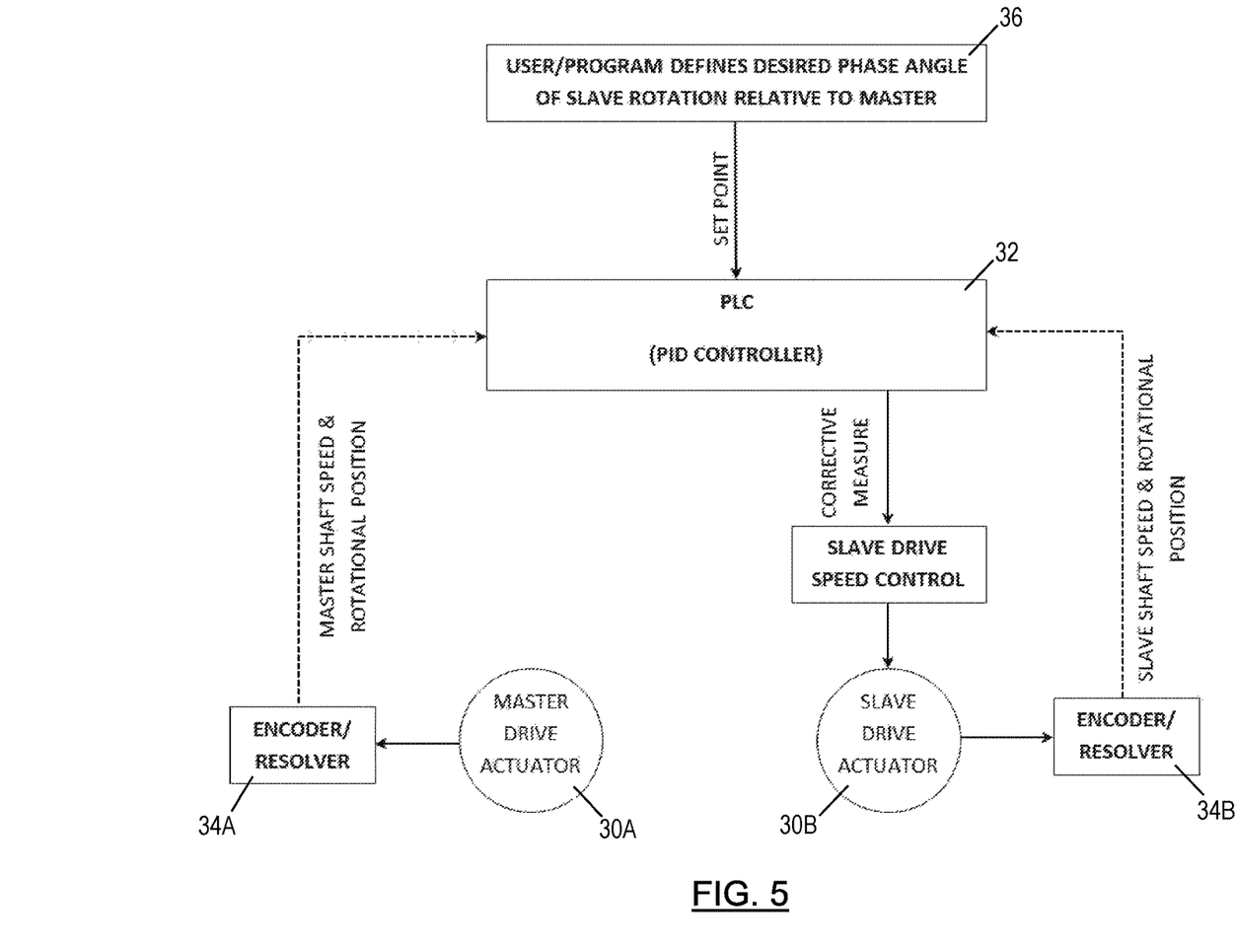
FIG. 5 is a schematic diagram of an exemplary embodiment of the drive system.

The illustrated drive system 15 also includes an angular position sensor 34 (which may also be referred to as a shaft angle transducer) for each drive shaft 17. The angular positions sensors 34 may be of any conventional type, for example the potentiometer type, the encoder type (including magnetic or optical, absolute or incremental), or the resolver type. The respective angular position sensor 34 is coupled to, or otherwise co-operable with, the respective shaft 17 in any conventional manner. The coupling between the sensor 34 and the shaft 17 may involve mechanical contact with the shaft or may be contactless, and may be direct or indirect as is convenient. For example, the sensors 34 may be physically connected to the shaft, or may be contactless, and may be provided as a separate component or incorporated into the motor as is convenient. In use, the respective angular position sensor 34 detects the angular position of the respective shaft 17 and communicates angular position information to the controller 32. Optionally, the angular position sensor 34 is able to, or its output may be used to, determine the rotational speed of the respective shaft 17. In cases where this is not possible, a separate respective rotational speed sensor, of any convenient conventional type, may be provided for measuring the rotational speed of each shaft 17. In any event, it is generally desirable for the controller 32 to receive, in use, information indicating the rotational speed of the respective shaft 17, or information from which it can determine the rotation speed of the respective shaft 17.

The controller 32 may be located at any convenient location on the screening apparatus 10, or the material processing apparatus 13 of which the screening apparatus 10 is part, or may be located elsewhere, e.g. at a separate control station or mobile unit. The controller 32 may be connected to, or connectable to, the drive mechanisms and sensors by any convenient wired or wireless link for sending control signals and receiving output signals as applicable.

Optionally, the controller 32 is capable of controlling the respective drive mechanism to control rotation of each drive shaft 17 independently of the other drive shaft(s) 17. In particular, the controller 32 is capable of controlling the speed, and optionally also the direction, of the rotation of each drive shaft 17 by controlling the respective drive mechanism. In some embodiments, at least one of, and optionally each of, the respective motors 30A, 30B is a bi-directional motor. Optionally, each motor 30A, 30B is a variable speed motor. The motors 30A, 30B may be controlled by the controller 32 using any suitable control signal(s). In alternative embodiments, the controller 32 is capable of controlling, via the respective drive mechanism, the rotation (speed and/or rotational direction) of at least one but not necessarily all of, the drive shafts 17. In any event, the controller advantageously adjusts the relative rotational speed of the drive shafts to adjust the relative angular position of their respective centre of mass.

The controller 32 may also be configured to adjust the phase difference angle between shafts 17A, 17B (or any two or more shafts where there are more than two shafts) by causing the respective shafts 17A, 17B to be rotated at different speeds until a desired phase angle difference is achieved. This may be achieved by adjusting the speed of one or more of the respective shafts 17, as is convenient. Determining that the desired phase angle difference has been achieved may be performed by comparing the respective phase angle of the respective shafts 17 using the respective angular position information provided by the respective angular position sensors 34. After the desired phase angle difference is achieved, the controller 32 may cause the shafts 17A, 17B to be rotated at the same speed to maintain the desired phase angle difference.

The input settings for rotation speed, rotation direction and/or phase difference angle, as applicable, may be provided as part of the programming of the controller 32 and/or may be provided by a user using any convenient user interface. Typically, the controller 32 receives input settings indicating any one or more of rotation direction, rotation speed, desired phase difference angle between any two or more shafts, and/or desired phase angle of any two or more shafts, and may set and/or adjust the rotation of one or more of the respective shafts 17 accordingly. In the case where input settings are received from the user interface, the controller 32 may respond in real time to the input settings to set and/or adjust one or more rotation characteristic of the shaft(s) 17 accordingly. In the case where the input settings are received from the programming of the controller 32, the controller 32 may set and/or adjust one or more rotation characteristics of the shaft(s) 17 in accordance with a pre-determined program. In either case, the rotation characteristics of the shaft(s) 17, including rotation speed, phase difference angle and/or rotation direction, can be set and adjusted as desired without having to halt the screening process being performed by the screening apparatus 10. Accordingly the vibration characteristics of the screening apparatus 10 can be set and adjusted without having to halt the screening process.

Referring now to FIG. 5 in particular, an exemplary embodiment of the drive system 15 is described. The controller 32 obtains desired input settings for the drive shafts 15 from a user interface or program represented in FIG. 5 as 36. The settings may indicate any one or more of rotational speed for any one or more of the shafts 17, rotational direction for any one or more of the shafts 17 and/or phase difference angle for any two or more of the shafts 17, as applicable. The relevant parameter values may be provided directly as the input settings or indirectly in which case the settings may specify one or more desired vibration characteristics from which the relevant parameter values can be determined.

In this example, the first drive shaft 17A is operated as a master drive shaft and the second drive shaft 17B is operated as a corresponding slave drive shaft. The controller 32 operates the drive mechanism (in this case the motor 30A) of the master drive shaft 17A to rotate the master drive shaft 17A at a desired rotational speed. The controller 32 obtains information from the sensor 34A of the master shaft 17A from which the rotational speed and phase angle of the master drive shaft 17A can be determined. The relevant information from the sensor 34A and the relevant input setting(s) can be used to facilitate controlling the master drive shaft 17A using any convenient feedback control technique, for example PID feedback control.

The controller 32 obtains information from the sensor 34B of the slave shaft 17B indicating the phase angle of the slave drive shaft 17B. The rotational speed of the slave shaft 17B is typically also determined by the controller 32 from the sensor 34A (or other speed sensor as applicable). The controller 32 compares the phase angle of the slave drive shaft 17B and the phase angle of the master drive shaft 17A to determine the actual phase difference angle. If the measured phase difference angle is different than the desired phase difference angle (as indicated by the input settings), then the controller 32 adjusts the speed of the slave drive shaft 17B (such that it is different from the speed of the master drive shaft 17A) until the desired phase angle difference is achieved. The relevant information from the sensor 34B and the relevant input setting(s) can be used to facilitate controlling the master drive shaft 17B to achieve the desired phase difference angle using any convenient feedback control technique, for example PID feedback control. Once the desired phase difference angle is achieved, the controller 32 adjusts the speed of the slave drive 17B to match the speed of the master drive 17A in order to maintain the desired phase difference angle.

In the above example, the master drive shaft 17A may be uni-directional (i.e. driven in one direction only by a uni-directional or bi-directional motor), while the slave drive shaft 17B may be driven in either direction. In alternative embodiments, the shafts 17 need not necessarily operate with a master-slave relationship.

The controller 32 may continually or periodically monitor the actual phase difference angle and take corrective action (in this case by adjusting the speed of the slave drive shaft 17B as described above) to maintain the desired phase difference angle.

Should the speed of the master drive shaft 17A change (e.g. as a result of a change in the input settings), then the controller 32 may control the speed of the slave drive shaft 17B (such that it is different from the speed of the master drive shaft 17A) until the desired phase angle difference is achieved, as described above. Once the desired phase difference angle is achieved, the controller 32 adjusts the speed of the slave drive 17B to match the new speed of the master drive 17A in order to maintain the desired phase difference angle. The controller 32 may take the same action in response to a change in the desired phase difference angle (e.g. as a result of a change in the input settings).

The controller 32 may also set or change the rotational direction of either one or both of the shafts 17A, 17B in accordance with the input settings. Adjusting the relative speed between the shafts 17 in order to create and maintain a desired phase angle difference may be performed, for example as described above, irrespective of the direction of rotation of the shafts 17.

It will be appreciated that the invention is not limited to the embodiment(s) described herein, but can be amended or modified without departing from the scope of the present invention, which his intended to be limited only by the scope of the appended claims as interpreted according to the principles of patent law including the doctrine of equivalents.

The invention claimed is:

1. A vibratory drive system comprising
    a plurality of rotatable drive shafts each having a centre of mass offset from its rotational axis;
    a respective drive mechanism coupled to a respective one of said drive shafts for rotating the respective one of said drive shafts; and
    a controller for operating at least one of said drive mechanisms to control the rotational speed of the respective one of said drive shafts;
    wherein said controller is configured to adjust the rotational speed of at least one of said drive shafts to adjust the relative angular position of the respective centre of mass of at least two of said drive shafts; and
    wherein at least one of the drive mechanisms comprises a reversible hydraulic motor mounted on an end of the respective shaft and being operable by the controller to rotate the respective drive shaft in either one of two rotational directions.

2. The drive system of claim 1, wherein said controller is configured to adjust the rotational speed of at least one of said drive shafts to cause at least two of said drive shafts to rotate at different speeds until a desired relative angular position of the respective centres of mass is achieved, and then to cause said at least two drive shafts to rotate at the same speed.

3. The drive system of claim 2, wherein said controller is configured to adjust the rotational speed of said at least one drive shaft in response to a change in rotational speed of another of said drive shafts.

4. The drive system of claim 1, wherein said controller is configured to receive an input indicating at least one desired rotational speed for at least one of said drive shafts, and to adjust the rotational speed of said at least one drive shaft to match said at least one desired rotational speed.

5. The drive system of claim 1, wherein said controller is configured to receive an input indicating at least one desired relative angular position of at least two of said drive shafts, and is configured to adjust the rotational speed of at least one of said drive shafts to cause said at least two drive shafts to rotate at different speeds until said at least one desired relative angular position is achieved.

6. The drive system of claim 1, wherein all of said drive mechanisms are operable to rotate the respective one of said drive shafts in either one of two rotational directions, said controller being configured to cause said respective drive shaft to rotate in a desired rotational direction.

7. The drive system of claim 6, wherein said controller is configured to receive an input indicating at least one desired rotational direction for at least one of said drive shafts.

8. The drive system as claimed in claim 1, wherein each of said drive mechanisms comprises a hydraulic motor mounted on an end of the respective drive shaft.

9. The drive system as claimed in claim 8, wherein each of said hydraulic motors is a reversible hydraulic motor.

10. The drive system of claim 1, wherein said motor is coupled to the respective one of said drive shafts to provide direct drive to the respective one of said drive shafts.

11. The drive system as claimed in claim 1, wherein said plurality of drive shafts comprise first and second drive shafts, said controller being configured to adjust the rotational speed of either one or both of said first and second drive shafts to adjust the relative angular position of the respective centre of mass of said first and second drive shafts.

12. The drive system of claim 11, wherein said controller is configured to determine an actual relative angular position between said first and second drive shafts, and to adjust the rotational speed of either one or both of said first and second drive shafts to achieve a desired relative angular position between said first and second drive shafts.

13. The drive system as claimed in claim 1, wherein said controller is configured to determine an actual relative angular position between said at least two of said drive shafts, and to adjust the rotational speed of at least one of said drive shafts to adjust the relative angular position of the respective centre of mass of at least two of said drive shafts to achieve a desired relative angular position between said at least two drive shafts.

14. The drive system of as claimed in claim 1, wherein a respective angular position sensor is coupled to each of said drive shafts for detecting an angular position of the respective one of said drive shafts, and communicating corresponding angular position information to said controller, and wherein said controller is configured to determine said relative angular position from said angular position information for said respective drive shafts.

15. The drive system of claim 14, wherein said angular position sensor provides information indicative of the rotational speed of the respective one of said drive shafts.

16. The drive system as claimed in claim 1, wherein a rotational speed sensor is coupled to each of said drive shafts for detecting the rotational speed the respective one of said drive shafts, and communicating corresponding speed information to said controller.

17. A material processing apparatus comprising:
    at least one vibrating component; and
    a drive system for vibrating said at least one vibrating component;
    wherein said drive system comprises:
        a plurality of rotatable drive shafts each having a centre of mass offset from its rotational axis,
        a respective drive mechanism coupled to a respective one of said drive shafts for rotating the respective one of said drive shafts; and
        a controller for operating at least one of said drive mechanisms to control the rotational speed of the respective one of said drive shafts;
    wherein said controller is configured to adjust the rotational speed of at least one of said drive shafts to adjust the relative angular position of the respective centre of mass of at least two of said drive shafts; and
    wherein at least one of the drive mechanisms comprises a reversible hydraulic motor mounted on an end of the respective shaft and being operable by the controller to rotate the respective drive shaft in either one of two rotational directions.

18. The material processing apparatus of claim 17, wherein said at least one vibrating component comprises at least one screen.

* * * * *